United States Patent [19]
Kojima

[11] Patent Number: 5,159,448
[45] Date of Patent: Oct. 27, 1992

[54] HIGHLY EFFICIENT CODING APPARATUS

[75] Inventor: Yuichi Kojima, Kanagawa, Japan

[73] Assignee: Sony Corporation, Japan

[21] Appl. No.: 785,002

[22] Filed: Oct. 30, 1991

[30] Foreign Application Priority Data

Nov. 20, 1990 [JP] Japan .................................. 2-315578

[51] Int. Cl.$^5$ ........................................... H04N 7/137
[52] U.S. Cl. ....................................... 358/135; 375/33
[58] Field of Search ....................... 358/133, 135, 136; 375/27, 33

[56] References Cited

U.S. PATENT DOCUMENTS

| | | | |
|---|---|---|---|
| 4,831,636 | 5/1989 | Taniguchi | 375/27 |
| 4,907,081 | 3/1990 | Okamura | 358/133 |
| 4,949,176 | 8/1990 | Levy | 358/135 |
| 5,049,990 | 9/1991 | Kondo | 358/133 |

Primary Examiner—Howard W. Britton
Attorney, Agent, or Firm—Ronald P. Kananen

[57] ABSTRACT

A highly efficient coding apparatus is made for developing a prediction value from a value which is ahead in time, correlation. The apparatus comprises, first to M-th prediction circuits supplied with a picture signal of each of M areas which divide a picture composed of plural lines, each consisting of plural picture elements and generating output, respectively, the first prediction circuit having structure for selecting a prediction value generated by itself and an initial value, the prediction circuits other than the first prediction circuit having structure for selecting prediction values generated by themselves and other prediction values generated by the prediction circuits for processing divided areas adjacent in space and being ahead in time, whereby the other prediction circuits select other prediction values through the selecting structure at timing of processisng of picture element data which is closest to the border of the divided areas.

4 Claims, 5 Drawing Sheets

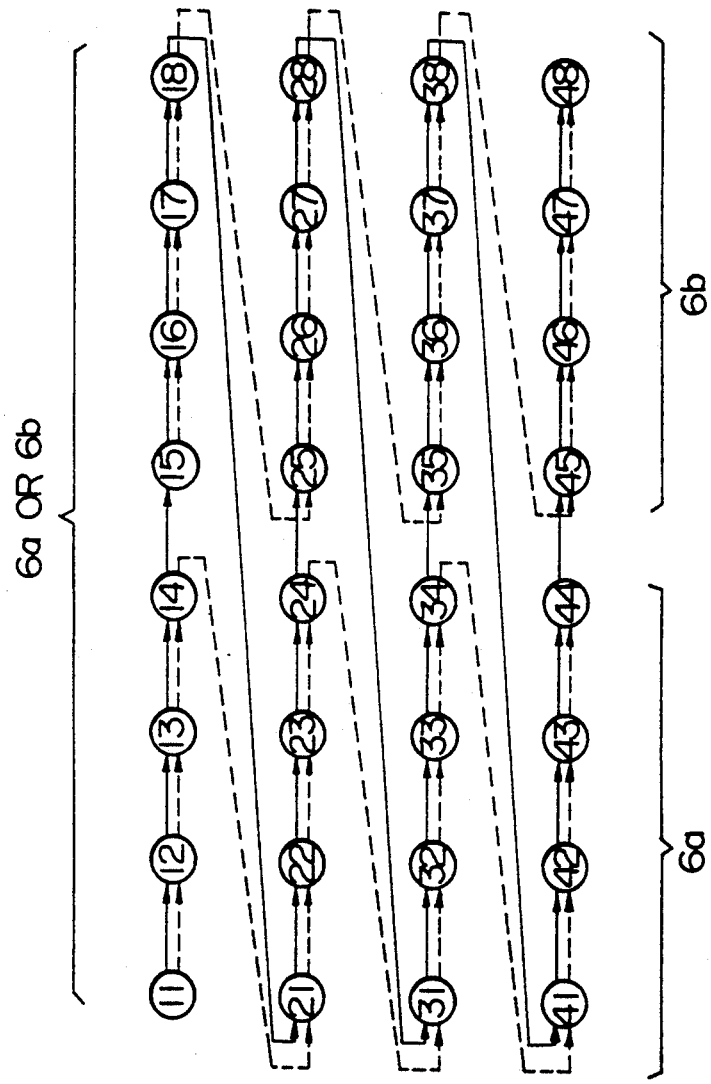

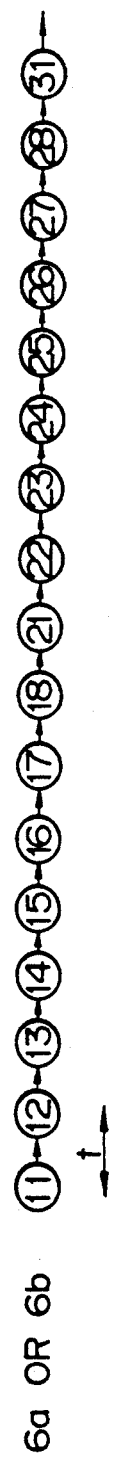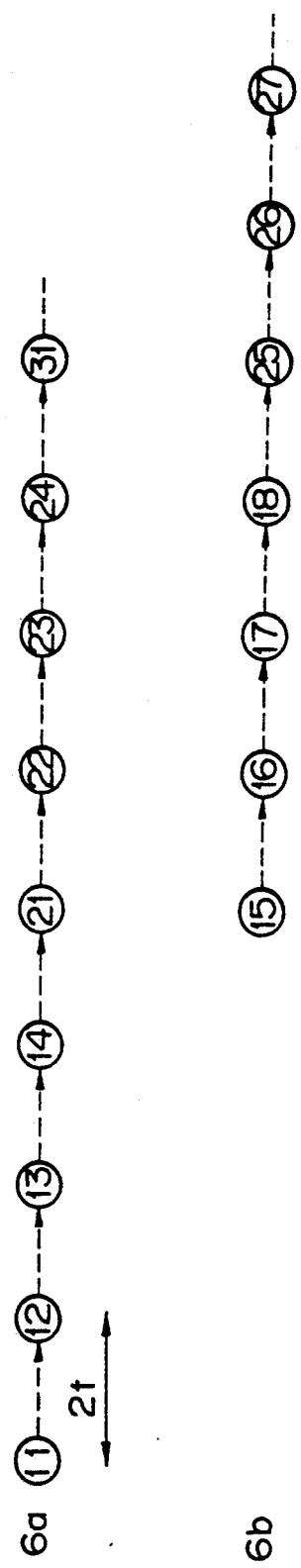
Fig. 4A
Fig. 4B

HIGHLY EFFICIENT CODING APPARATUS

BACKGROUND OF THE INVENTION

1. Field of the Invention

The present invention relates to a highly efficient coding apparatus and, more particularly, to a highly efficient coding apparatus using predictive coding.

2. Description of the Prior Art

Prediction coding has been known as one highly efficient coding for lowering the bit rate of a digital picture signal. FIG. 1 shows its typical one. In FIG. 1, reference numeral 31 is a transmission side or encoder, reference numeral 32 is a reception side or encoder, and reference numeral 33 is a transmission line such as a digital line, wherein a process of magnetic recording-/reproduction is provided between both sides A digital picture signal from an input terminal 34 and a prediction value from a local decoder are given to a subtractor 35, and a difference signal from the subtractor 35 is supplied to a non-linear quantization circuit 36. The local decoder is composed of a representative value circuit 37, an adder 38, and a one sample delay circuit 39. The non-linear quantization valve circuit 36 and the representative circuit 37 have complementary characteristics with each other and are usually made up of an ROM.

The output data of the non linear quantization valve circuit 36 is given through the transmission line 33 to a representative circuit 41 on the reception side 32, and a quantization code is decoded into a representative value. The representative value is supplied to an adder 42 and added to the output signal of the adder 42 given through a one sample delay circuit 43. The output signal of the adder 42 is taken out at an output terminal 44 as a decoded output.

Such a highly efficient coding apparatus provides a high prediction efficiency and is an effective system when the sampling density is high. However, since a locally decoded value of a previous picture element is employed, there is a problem in the operation speed. Namely, the total delay amount of the subtractor 35, the non-linear quantization circuit 36, the representative value circuit 37 and the adder 38 must lie within one time slot of input data. For example, the prior art structure of FIG. 1 is not suited for the processing of a picture signal of the high bit rate such as a high vision signal.

For one method for solving such a problem, a system described "Adaptive Intraframe/Interframe Coding for HDTV signals by Using Extrapolative and Interpolative Prediction," an article published by the Institute of Electronics, Information and Communication Engineers of Japan, January 1987, Vol. J70-B No. 1, pp. 96–104 has been proposed.

In this method, picture elements are divided into two groups G1 and G2 to provide a quincunx. With respect to the G1 picture elements, extrapolative prediction using only the G1 picture elements, which have already been subjected to coding/decoding, is done in intraframe prediction and interframe prediction. As to the G2 picture elements, extrapolative prediction using the G2 picture elements in a previous frame, which have already been subjected to coding/decoding, is done in the interframe prediction, while with respect to the intraframe prediction, interpolative is prediction done by the G1 picture elements. With this method, since previous picture elements are not used in the intraframe extrapolative prediction, the processing time can be reduced. Also, as to the G2 picture elements, because only the G1 picture elements are used in the intraframe interpolative, no feedback loop is needed to allow the problem of the processing time to be solved.

However, in the apparatus described in the article, the interval between picture elements in the case of intraframe prediction is enlarged twice the original one with the result that correlation is lowered. As a result, there is a disadvantage that prediction efficiency is decreased.

Particularly, with increased prediction efficiency in the case of a fine pattern, there is a problem in picture quality in the worst case.

Further, there is considered a prediction coding method in which a picture is divided into plural ones and parallel prediction coding is done for every divided picture to improve the processing speed.

In this method, not only is there a problem that an initial value must be transmitted for each divided area but also there is a problem that the border of the areas is remarkably seen since its initial value portion must be processed exceptionally.

OBJECTS AND SUMMARY OF THE INVENTION

An object of the invention is, therefore, to provide a highly efficient coding apparatus capable of solving the above-mentioned problem and suitable for a picture signal with high operation speed.

According to an aspect of the invention, there is provided a highly efficient coding apparatus which comprises:

first to M-th prediction circuit (6a, ..., 6d) supplied with a picture signal of each of M areas which divide a picture composed of plural lines, each consisting of plural picture elements and generating outputs, respectively, the first prediction circuit (6a) having means S1a for selecting a prediction value generated by itself and an initial value, the prediction circuits (6b, ..., 6d) other than the first prediction circuit (6a) having means S1b, S1c, and S1d for selecting prediction values generated by themselves and other prediction values generated by the prediction circuits (6a, ..., 6c) for processing divided areas adjacent in space and being ahead in time, whereby the other prediction circuits (6b, ..., 6d) select other prediction values through the selecting means S1b, S1c, and S1d at a timing of processing of picture element data which is closest to the border of the divided areas.

In this way, since a picture is divided into M areas and since prediction coding is done for each area, coding is performed for data with the rate equal to 1/M of that of its original data. Consequently, coding of a picture signal with the high rate can be made. Also, since a prediction value of previous picture element data in the adjacent area is employed at the border portion, there is no problem that the border portion is remarkably seen in a decoded picture.

The above, and other, objects, features and advantages of the present invention will become readily apparent from the following detailed description thereof which is to be read in connection with the accompanying drawings.

BRIEF DESCRIPTION OF THE DRAWINGS

FIG. 3 is a schematic diagram for describing an operation Of one embodiment of the invention;

FIGS. 4A and 4B are schematic diagrams for describing an operation of one embodiment of the invention.

DETAILED DESCRIPTION OF THE PREFERRED EMBODIMENTS

Figure 1:
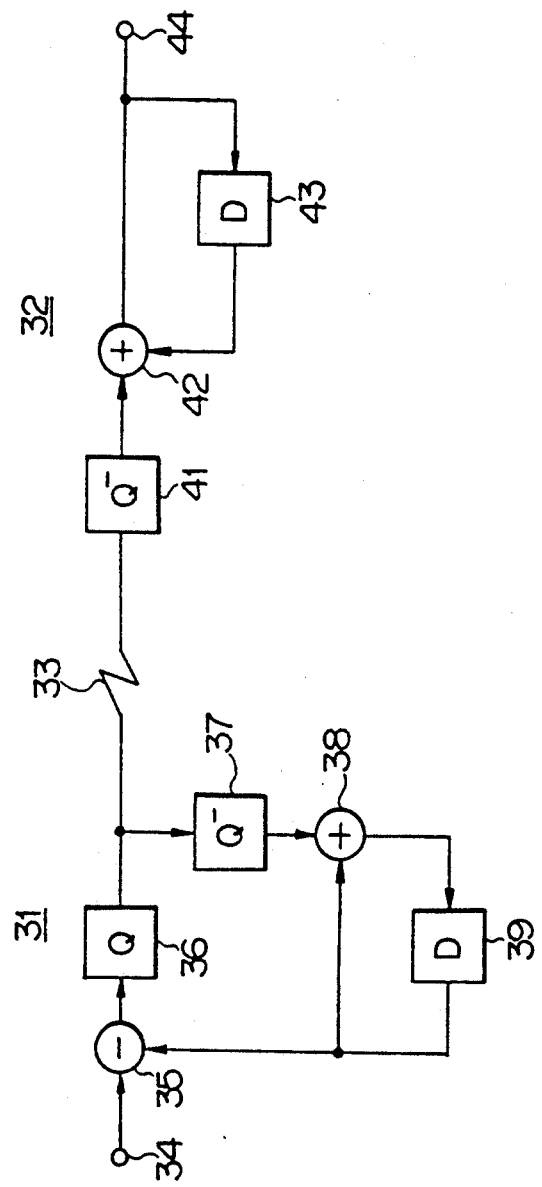
FIG. 1 is a block diagram showing one example of a prior art structure.

An embodiment of the present invention will be described hereunder referring to the drawings.

Figure 2:
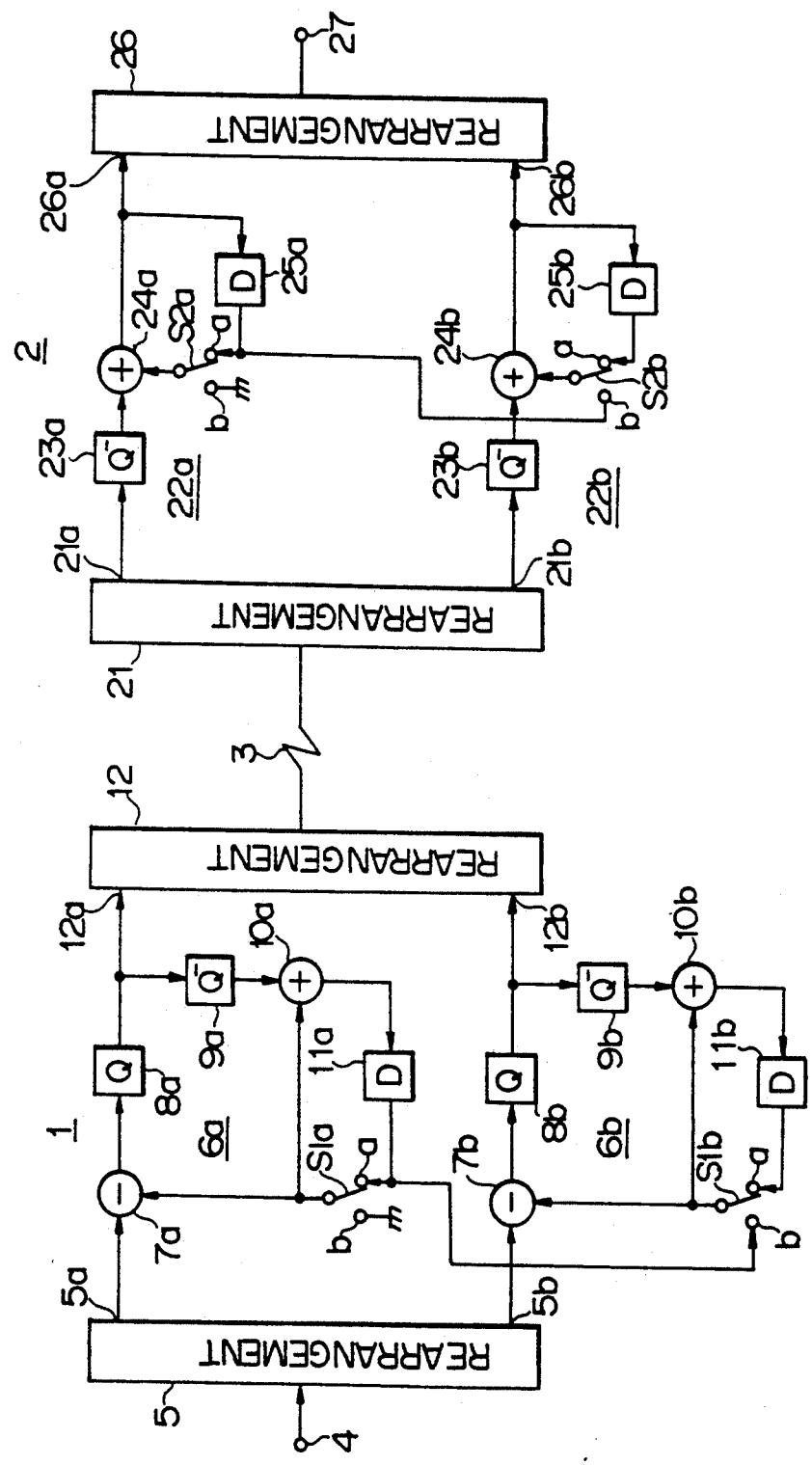
FIG. 2 is a block diagram of one embodiment of the invention.

Referring to FIG. 2, reference numeral 1 shows a transmission side or encoder, reference numeral 2 shows a reception side, or decoder, and reference numeral 3 shows a transmission line such as a digital channel, wherein a process of magnetic recording/reproduction is provided between both sides.

A digital picture signal, for example, a digital HDTV signal from an input terminal 4 is supplied to a rearrangement circuit 5. For instance, a picture of one field or one frame is divided into M. This embodiment is focused on the case of M=2. Data of each divided area appears at output terminals 5a and 5b of the rearrangement circuit 5.

A prediction coder 6a is connected to one output terminal 5a, while a prediction coder 6b is connected to the other output terminal 5b. In the prediction coder 6a, the data from the terminal 5a and a prediction value from a local decoder are supplied to a subtractor 7a. The subtractor 7a subtracts a locally decoded signal from the data. A difference signal from the subtractor 7a is supplied to a quantization circuit 8a. The local decoder is composed of a representative value circuit 9a, an adder 10a one sample delay circuit 11a, and a switch circuit S1a. The non-linear quantization circuit 8a has a characteristic complementary to that of the representative value circuit 9a.

The output data of the one sample delay circuit 11a is given to one input terminal a of the switch circuit S1a, while an initial value, for example, zero data is supplied to the other input terminal b. The output of the switch circuit S1a is supplied to the subtractor 7a and the adder 10a.

The prediction coder 6b connected to the other output terminal 5b of the rearrangement circuit 5 has the same structure as that of the prediction coder 6a. However, the other input terminal b of a switch circuit S1b is connected to the output terminal of the one sample delay circuit 11a of the prediction coder 6a.

The coded output of the above-mentioned prediction coders 6a and 6b are given to input terminals 12a and 12b of a rearrangement circuit 12, respectively.

The rearrangement circuit 12 converts respective coded outputs of divided areas into one data sequence in the raster scanning order. Namely, it performs a reverse scanning conversion with the rearrangement circuit 12.

The output signal of the rearrangement circuit 12 is sent to the transmission line 3, and data through the transmission line 3 is supplied to a rearrangement circuit 21 on the reception side. The rearrangement circuit 21 converts coded data of one field or one frame into coded outputs corresponding to two areas.

Reception data taken out at one output terminal 21a of the rearrangement circuit 21 is given to a representative value circuit 23a of a prediction decoder 22a, while reception data taken out at the other output terminal 21b is supplied to a representative value circuit 23b of a prediction decoder 22b.

A quantization code is decoded into a representative value by the representative value circuit 23a. The representative value is supplied to an adder 24a and added to the output signal of the adder 24a given via one sample delay circuit 25a and a switch circuit S2a. The output signal of the adder 24a is supplied to one input terminal 26a of a rearrangement circuit 26 as a decoded output.

The output of a one sample delay circuit 25a is given to an input terminal a of the switch circuit S2a, while zero data is fed to the other input terminal b.

The prediction decoder 22b connected to the output terminal 21b of the rearrangement circuit 21 has the same structure as the above-stated prediction decoder 22a. Here, the other input terminal b of a switch circuits 2b of the prediction decoder 22b is connected to the output terminal of the one sample delay circuit 25a of the prediction decoder 22a.

In the above-described embodiment of the invention, the rearrangement circuits 5, 12, 21 and 26 are made up of a memory and have functions for enabling the generation of data sequences for each of two-divided areas of one picture as well as for generation of input digital video signal sequences at one output terminal as they are. For this switching, a mode switching signal is given to the rearrangement circuits 5, 12, 21 and 26, although not shown. With this, a continuous processing mode is possible when the data rate of the input digital video signal is not so high, in addition to a division processing mode which provides a future of the present invention.

For simplicity of explanation, rearrangement processing will be described taking an example of a picture of four lines each consisting of eight picture elements as shown in FIG. 3.

In FIG. 3, the sequence indicated by a solid line is the raster scanning sequence. In a continuous mode, a data sequence of the raster scanning order is generated at the output terminal 5a of the rearrangement circuit 5, and, as shown in FIG. 4A, continuous processing is made by the prediction coder 6a. t is a sampling period. Therefore, decoding is done using only the prediction decoder 22a on the reception side. In the continuous mode, the switch circuit S1a of the prediction coder 6a selects zero data as an initial value at timing of head picture elements (11, 21, 31 and 41) of each line, for example.

The switch circuit S2a of the prediction decoder 22a selects zero data at timing the of the above-mentioned initial value from the transmission side. Needless to say, only the prediction coder 6b and the prediction decoder 22b may be used in the continuous mode.

In a division processing mode, the rearrangement circuit 5 on the transmission side or the rearrangement circuit 21 on the reception side produces picture element data of each area provided by the division of a picture by two in the horizontal direction in the order indicated by a broken line in FIG. 3.

When numbers indicated in FIG. 3 are attached to each picture element data, picture element data is output in the order of (11, 12, 13, 14, 21, 22, ..., 43, and 44) from the output terminal 5a of the rearrangement circuit 5. Picture element data is output from the output terminal 5b of the rearrangement circuit 5 in the order of (15, 16, 17, 18, 25, 26, ..., 47, and 48). In these two data sequences from the rearrangement circuit 5, the period of picture element data is 2t which is twice its original t.

In the division processing mode, the switch circuit S1a of the prediction coder 6a selects zero data as an initial value at the timing of the head picture elements (11, 12, 31 and 41) of each line, for example, while the switch circuit S1b of the prediction coder 6b selects the local decoded output of one sample delay circuit 11a of the prediction coder 6a as a prediction value at the timing of the head picture elements (15, 25, and 45) of the divided areas. The switch circuits S2a and S2b of the prediction decoders 22a and 22b select zero data at a the timing of the above-mentioned initial value from the transmission side, while the switch circuit S2b of the prediction decoder 22b selects decoded data of the output of one sample delay circuit 25a at the same timing with the above-stated switch S1b.

As a result, the prediction coders 6a and 6b perform sequential prediction coding of picture element data with a period of 2t as shown in FIG. 4B.

The coding process for the area on the righthanded side with respect to FIG. 3 is delayed by picture elements contained in ½ line (four picture elements in this case) with respect to the coding process for the area on the left-handed side. As mentioned above, the prediction coder 6b selects a locally decoded output corresponding to picture element data (14, 24, 34, and 44) which has already been obtained by the prediction coder 6a as an initial value of the head in the area on the right-handed side to be coded. As a result, it is possible to perform a process equivalent to continuous processing even if it is divided processing. Since the prediction decoders 22a and 22b perform decoding processing in a similar manner to the prediction coders 6a and 6b, the problem that a border between areas in a decoded output is markedly seen can be avoided.

Although a picture of one field or one frame is divided into two in the above-mentioned one embodiment, the number of divisions is not limited to this. For example, one example on the transmission side (encoder) in the case of four-division processing is shown in FIG. 5.

Figure 5:
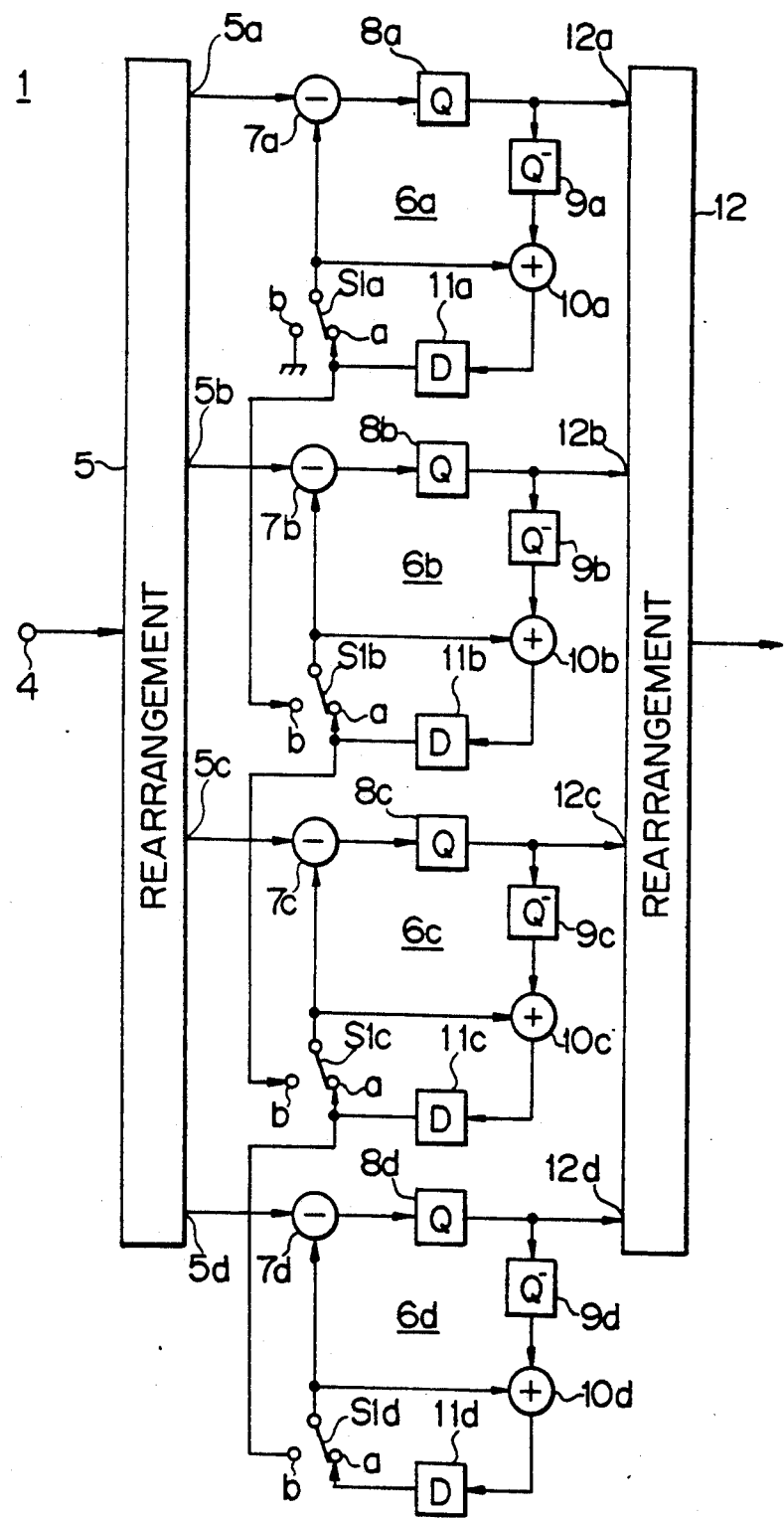
FIG. 5 is a block diagram of another embodiment of the invention.

In FIG. 5, sequences of picture element data in each of four divided areas of one picture in the horizontal direction are generated at each of four output terminals 5a, 5b, 5c and 5d led from the rearrangement circuit 5. Prediction coders 6a, 6b, 6c and 6d are connected to each of the output terminals 5a, 5b, 5c and 5d. Each prediction coder is the same one as that of the above-mentioned embodiment.

The switch circuit S1a of the prediction coder 6a which processes the area lying on the most left-handed side in a picture, that is, picture element data of the head, selects zero data as an initial value. An input terminal b of the switch circuit S1b of the prediction coder 6b which processes the second area is connected to the output terminal of one sample delay circuit 11a of the prediction coder 6a. An input terminal b of a switch circuit S1c of the prediction coder 6c which processes the third area is connected to the output terminal of one sample delay circuit 11b of the prediction coder 6b. An input terminal b of the switch circuit S1d of the prediction coder 6d which processes the area on the most right-handed side is connected to the output terminal of the one sample delay circuit 11c of the prediction coder 6c.

The other prediction coders 6b, 6c, and 6d than the prediction coder 6a, which processes the area containing picture elements in the head of each line, use prediction values generated by themselves and other prediction values generated by other prediction coders, which process the area adjacent in space and being ahead in time, by the switching operation.

This invention has an advantage that a high rate picture signal such as a high vision signal can be prediction-coded. Since prediction is done using previous picture element data in this invention, the prediction efficiency is high and the problem that the border of divided areas is seen in a decoded picture can be avoided.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. In a highly efficient coding apparatus for developing a prediction value from a value which is ahead in time, using one-dimensional or two-dimentional correlation, the apparatus comprising:
    a first to M-th prediction circuit supplied with a picture signal of each of M areas which divide a picture composed of plural lines, each consisting of plural picture elements and generating outputs, respectively,
    the first prediction circuit having means for selecting a prediction value generated by itself and an initial value, the prediction circuits other than the first prediction circuit having means for selecting prediction values generated by themselves and other prediction values generated by the prediction circuits for processing divided areas adjacent in space and being ahead in time, whereby the other prediction circuits select other prediction values through the selecting means at a timing of processing of picture element data which is closest to the border of the divided areas.

2. A highly efficient coding apparatus as claimed in claim 1 further comprising rearrangement means for dividing an input signal of raster scanning into picture signals of said divided areas.

3. A highly efficient coding apparatus as claimed in claim 1, wherein each of said first to the M-th prediction circuits includes a representative value generating means coupled to a non-linear quantization circuit, an adder coupled to the representative value generating means, and delay means coupled to the adder for generating said prediction value, and wherein said selecting means is coupled to said delay means.

4. A highly efficient coding apparatus as claimed in claim 1, wherein said digital picture signal is a HDTV signal.

* * * * *